L. GATHMANN.
Middlings-Purifier.

No. 8,929. Reissued Oct. 14, 1879.

Witnesses:
H. A. Daniels.
G. B. Fowles.

Inventor:
Louis Gathmann
By W. Burris
Attorney.

N. PETERS, PHOTO-LITHOGRAPHER, WASHINGTON, D. C.

L. GATHMANN.
Middlings-Purifier.

No. 8,929. Reissued Oct. 14, 1879.

Witnesses:
H. A. Daniels
G. B. Fowler.

Inventor:
Louis Gathmann
By W. Burris
Attorney.

N. PETERS, PHOTO-LITHOGRAPHER, WASHINGTON, D. C.

UNITED STATES PATENT OFFICE.

LOUIS GATHMANN, OF CHICAGO, ILLINOIS.

IMPROVEMENT IN MIDDLINGS-PURIFIERS.

Specification forming part of Letters Patent No. 161,875, dated April 13, 1875; Reissue No. 8,929, dated October 14, 1879; application filed July 26, 1879.

*To all whom it may concern:*

Be it known that I, LOUIS GATHMANN, of Chicago, in the county of Cook and State of Illinois, have invented certain new and useful Improvements in Middlings-Purifiers; and I do hereby declare that the following is a full, clear, and exact description of the invention, that will enable others skilled in the art to which it appertains to make and use the same, reference being had to the accompanying drawings, and to the letters of reference marked thereon, which form a part of this specification.

My invention consists of a middlings-purifier having a series of sieves of different degrees of fineness, arranged one above another in planes substantially parallel to each other, and having below each sieve a carrier-board for discharging from the machine the middlings falling through the sieve, and a return-board between each pair of sieves to convey to the head of the next lower sieve the materials passing over the tail of the upper sieve, and having a fan for producing air-currents through and between the sieves and valves, to regulate the currents of air, and having scrapers, peculiarly constructed and operated, for removing the substances which clog the meshes of the sieves, as hereinafter fully described.

Figure 1:
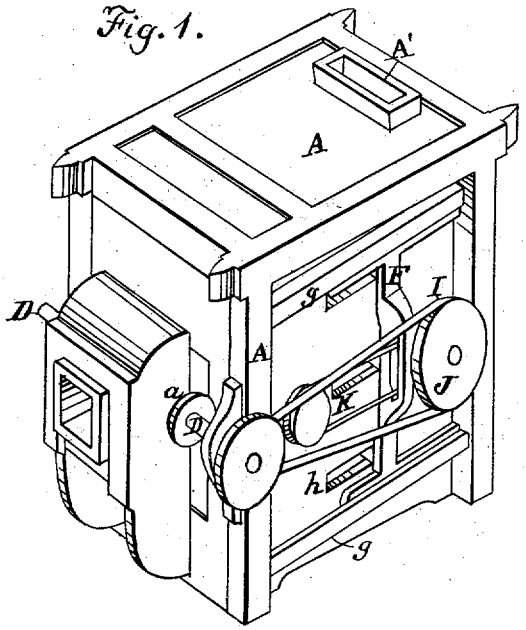
Figure 2:
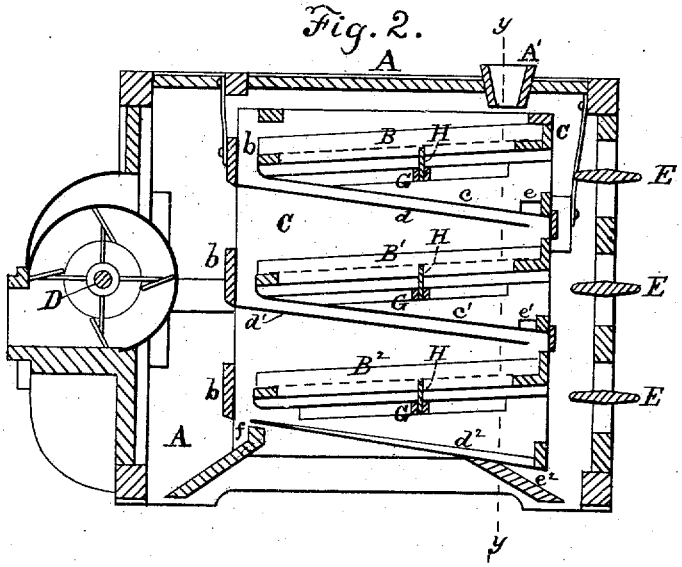
Figure 3:
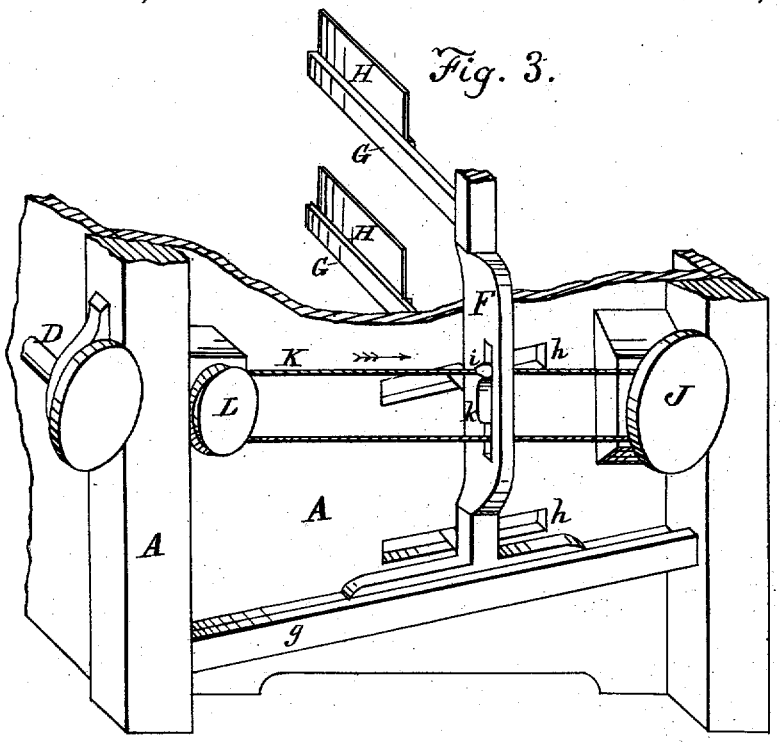
Figure 4:
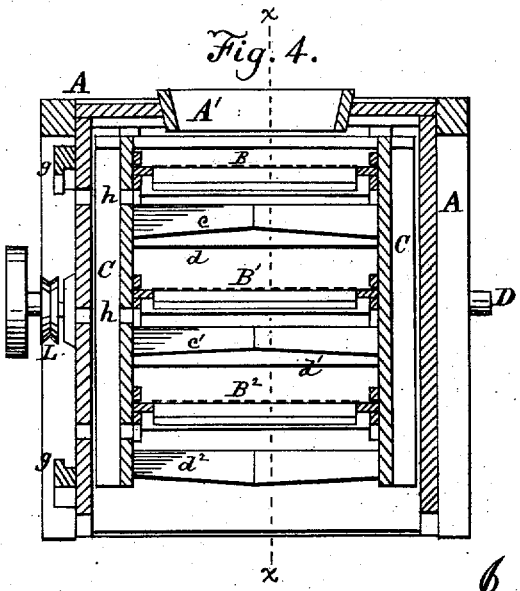

Figure 1 on Sheet 1 of the drawings is a perspective view of the machine. Fig. 2 on Sheet 1 is a longitudinal vertical section on line *x x* of Fig. 4. Fig. 3 on Sheet 2 is a perspective view of a portion of the machine, showing the scrapers and their operating devices. Fig. 4 is a transverse vertical section on line *y y* of Fig. 2.

In the drawings, A represents the frame and casing of the machine, provided with a hopper, A′. B $B^1$ $B^2$ are inclined sieves, arranged in planes substantially parallel to each other in a vibrating frame, C, suspended from the top of the casing of the machine. These sieves are graduated in fineness from the top downward, the top sieve being the finest, and each lower sieve being coarser than the one next above it.

A suction-fan is arranged on a shaft, D, having its bearings fastened to the frame A at the tail end of the machine. The frame C, carrying the sieves, is adjusted to have imparted to it a short, quick, vibratory motion by the cam *a* on the fan-shaft.

Below the screens are the carrier-boards *c* $c^1$ $d^2$, arched transversely, and arranged to incline to the head of the machine, to convey the materials passing through the sieves to the lateral spouts *e* $e^1$ $e^2$ at each lower corner of the boards; and below the carrier-boards *c c′*, and parallel with them, are arranged the return-boards, *d* $d^1$, for conveying the materials passing over the tails of the upper sieves to the head of the next lower sieves.

At the foot of the sieves tail-boards *b* are arranged to catch and return the materials passing over the tails of the sieves.

E represents valves adjusted in the front end of the machine to regulate the volume and force of the currents of air through the machine.

The letter *f* represents a spout for conducting the coarse heavy materials passing over the sieve $B^2$ into the tail of the machine, whence they may be discharged by a spout.

On one side of the machine guides *g g′* are fastened parallel to each other, and on the same inclination as the screens.

F represents a vertical bar provided with a slot, *k*, and having at each end a T-shaped head, adjusted to slide in rabbets in the guides *g g′*.

The casing is provided with slots *h* under the sieves, on the same inclination as the guides.

G represents horizontal arms attached to the standard F, and extending through the slots *h* across the sieves. These arms are provided with the scrapers H, of leather or vulcanized rubber, arranged on the arms so that the edges of the scrapers wipe the entire under surface of the sieves at each reciprocating movement of the standard and arms.

I is a belt running on a pulley on the fan-shaft and the pulley J, near the head of the machine.

K is an endless cord, provided with a knot or bulb, *i*, and running on the grooved pulley L and a pulley (not seen in the drawings) on the shaft of pulley J. This cord passes through the slot *k* in the standard F, the middle portion of which slot is wide enough to allow the knot on the cord to pass through it; but the upper and lower portions of the slot are narrowed, to prevent the knot from passing through, for the purpose of operating the scrapers.

The unpurified middlings fed into the machine through the hopper fall in a thin stream upon the upper end of the vibrating sieve B, which separates the fine from the coarse middlings. The light dust and other floating impurities are carried by the air-currents over the tail-board *b*, and thence down through the fan out of the machine.

The fine middlings, passing through the screen B, fall upon the carrier-board *c*, and are carried to the lateral spouts *e*, at each lower corner of the board, and conveyed off through these spouts.

The coarse middlings and heavy impurities, passing over the tail of the sieve B, drop upon the return-board *d*, and are conveyed by that board to the head of the sieve $B^1$. The middlings which are fine enough to pass through this sieve fall upon the carrier-board $c^1$, and are carried to the spouts $e^1$, and conveyed away.

The coarser middlings and heavy impurities, passing over the tail of the sieve $B^1$, fall on the return-board $d^1$, and are carried to the head of the sieve $B^2$. The middlings passing through this sieve fall on the carrier-board $d^2$, and are conveyed away through the spouts $e^2$.

The heavier and coarser materials passing over the tail of the last sieve are conveyed through spout *f* into the tail-end of the machine, to be removed by a spout or duct.

During the above-described operation the influent current of air, passing through each sieve, is regulated in volume and force, as required, by the valves E, so that a stronger current can be made to act on the materials as they pass over each successive sieve.

The bar F being at the lower ends of the guides *g g'*, the knot *i* on the cord K, moving in a horizontal plane in the direction indicated by the arrow in Fig. 3, strikes the bar at the upper and narrow portion of the slot *k*, carrying it up the inclined guides till the wide portion of the slot is presented to the knot, allowing it to pass through the slot. The bar then remains stationary at the upper ends of the guides till the knot in its reverse motion strikes the other side of the bar at the lower and narrow portion of the slot, carrying the bar down the guides till the wide portion of the slot is again presented, allowing the knot to return through the slot. The scrapers are thus moved back and forth against the lower surface of the sieves, removing the substances which would clog their meshes.

These leather or rubber scrapers are preferable to brushes, because in use the bristles of the brushes are liable to be forced into and thus enlarge the meshes of the sieves.

What I claim as new, and desire to secure by Letters Patent, is—

1. In a middlings-purifier, the combination of two or more sieves of different degrees of fineness, arranged one above the other in substantially parallel planes, a fan for producing air-currents through the sieves, a conveying-board below each sieve to discharge from the machine the middlings falling through the sieve, and a returning-board between each pair of sieves to return the materials passing over the tail of the upper sieve to the head of the lower sieve, substantially as described.

2. In a middlings-purifier, the combination of two or more sieves of different degrees of fineness, arranged one above the other in substantially parallel planes, a fan producing air-currents through the sieves, a conveying-board below each sieve to discharge from the machine the middlings falling through the sieve, a returning-board between each pair of sieves to return the materials passing over the tail of the upper sieve to the head of the lower sieve, and valves or dampers to regulate the volume and force of the air-currents, whereby a stronger current can be made to act on the materials as they pass over each successive sieve, substantially as and for the purposes described.

3. The scrapers H, attached to the bar F, adjusted to slide in the inclined guides *g*, and having the slot *k*, widened in the middle and narrowed at the ends, and operated by the endless cord K, provided with the knot or bulb *i*, in combination with the sieves B $B^1$ $B^2$, substantially as and for the purposes described.

In testimony that I claim the foregoing I have hereunto set my hand this 27th day of June, 1879.

LOUIS GATHMANN.

Witnesses:
JOHN W. CLARK,
G. J. FRAUENKNECHT.